(12) United States Patent
Zhou (10) Patent No.: US 9,217,678 B2
(45) Date of Patent: Dec. 22, 2015

(54) TOUCH SENSOR PANEL WITH CONDUCTIVE WIRES AND COLOR TRACES

(71) Applicant: NANCHANG O-FILM TECH. CO., LTD., Jiangxi (CN)

(72) Inventor: Fei Zhou, Jiangxi (CN)

(73) Assignee: Nanchang O-Film Tech Co., Ltd., Jiangxi (CN)

( * ) Notice: Subject to any disclaimer, the term of this patent is extended or adjusted under 35 U.S.C. 154(b) by 239 days.

(21) Appl. No.: 13/985,676

(22) PCT Filed: Jul. 5, 2013

(86) PCT No.: PCT/CN2013/078921
§ 371 (c)(1),
(2) Date: Aug. 15, 2013

(87) PCT Pub. No.: WO2014/121580
PCT Pub. Date: Aug. 14, 2014

(65) Prior Publication Data
US 2014/0218634 A1    Aug. 7, 2014

(30) Foreign Application Priority Data
Feb. 6, 2013   (CN) .......................... 2013 2 0070250

(51) Int. Cl.
*G01L 1/00* (2006.01)
*G06F 3/044* (2006.01)

(52) U.S. Cl.
CPC .............. *G01L 1/005* (2013.01); *G06F 3/044* (2013.01); *G06F 2203/04112* (2013.01)

(58) Field of Classification Search
CPC ..... G06F 3/044; G06F 3/041; G06F 3/04111; G06F 3/045; G06F 3/0412; G06F 3/0488; G02F 1/13338; G02F 2203/04112; G02F 2203/04103; H05K 9/00; H05K 3/1258; H05K 1/0296; H05K 1/0298; H05K 2201/0108; G12B 17/02; H01J 2229/8633; H01J 29/868; Y10S 345/902; Y10T 29/49155; Y10T 29/4913; H03K 17/9622; H03K 2217/960755

See application file for complete search history.

(56) References Cited

U.S. PATENT DOCUMENTS

| | | | |
|---|---|---|---|
| 2009/0091551 A1* | 4/2009 | Hotelling et al. | 345/174 |
| 2009/0267916 A1* | 10/2009 | Hotelling | 345/174 |
| 2010/0123670 A1* | 5/2010 | Philipp | 345/173 |
| 2012/0327021 A1* | 12/2012 | Ryu et al. | 345/174 |
| 2014/0118641 A1 | 5/2014 | Ryu et al. | |

FOREIGN PATENT DOCUMENTS

| | | |
|---|---|---|
| KR | 10-2012-0018059 A | 2/2012 |
| KR | 10-2013-0008313 A | 1/2013 |
| WO | 2011/062301 A1 | 5/2011 |

* cited by examiner

*Primary Examiner* — Nalini Mummalaneni
(74) *Attorney, Agent, or Firm* — Rosenberg, Klein & Lee (57) ABSTRACT

A touch sensing element is provided comprising an insulating substrate and a conductive layer located on a surface of the insulating substrate. The conductive layer comprises: a plurality of first conductive traces arranged at intervals along a first direction, each first conductive trace extending along a second direction; and a plurality of second conductive traces arranged to form second conductive trace columns, each second conductive trace column comprises a plurality of second conductive traces arranged at intervals along the second direction, each second conductive trace column is correspondingly located corresponding to a lateral direction of the first conductive trace. Each second conductive trace of each conductive trace column is spaced from and forms a mutual inductance with a corresponding first conductive trace. The conductive layer is formed on a surface of the insulating substrate. A touch panel having the touch sensing element is also provided.

7 Claims, 6 Drawing Sheets

TOUCH SENSOR PANEL WITH CONDUCTIVE WIRES AND COLOR TRACES

FIELD OF THE INVENTION

The present disclosure relates to a touch sensing element, and more particularly relates to a touch sensing element with a single conductive layer and a touch panel having the touch sensing element.

BACKGROUND OF THE INVENTION

Touch panels are widely used in various electronic devices as a way of simple human-computer interaction, such as in mobile phones and tablets, etc.

A touch panel usually includes a panel and a touch sensing element attached to a side of the panel. The touch sensing element includes an insulating layer, a sensing layer, and a driving layer. The sensing layer and the driving layer are located on two opposite surfaces of the insulating layer. The sensing layer includes a plurality of uncrossed sensing traces extended along a first direction. The driving layer includes a plurality of uncrossed driving traces extended along a second direction. The first direction is not parallel to the second direction. The sensing traces and the driving traces are separated by the insulating layer, which act as two electrode plates of a capacitor. Each sensing trace and a corresponding driving trace form a sensor node in an intersection region. When a touch object such as a finger, a stylus etc. touches the panel, the capacitance of the sensor node will change, which would realize the positioning of the touching and the execution of the touch instruction.

However, a structure of the touch sensing element of the touch panel is complicated, the sensing layer and the driving layer are formed on two opposite surfaces of the insulating layer during the producing of the element, and such process is complicated.

SUMMARY OF THE INVENTION

It is an object of the present disclosure to provide a touch sensing element and a touch panel having the touch sensing element with a relatively simple process.

A touch sensing element includes an insulating substrate and a conductive layer located on the insulating substrate, the conductive layer is located on a surface of the insulating substrate, the conductive layer includes: a plurality of first conductive traces arranged at intervals along a first direction of a two dimensional coordinate system, each of the first conductive traces extends along the second direction of the two dimensional coordinate system; and a plurality of second conductive traces columns arranged by a plurality of second conductive traces, each second conductive trace column comprises a plurality of second conductive traces arranged at intervals along the second direction of the two dimensional system, each second conductive trace column is located on a lateral side of the first conductive trace. Each second conductive trace of each conductive trace column and a corresponding first conductive trace are spaced from each other, the second conductive trace and the first conductive trace form a mutual inductance.

The conductive layer of the touch sensing element is formed on a surface of the insulating substrate, the structure and process of the touch sensing element are much simpler compared to the touch panel which forms a conductive layer on two surfaces of the insulating substrate to achieve touch operations.

According to one embodiment, the touch sensing element further includes a plurality of color traces, the color traces are located between the first conductive traces and the second conductive traces, and insulated from the first conductive traces and the second conductive traces.

According to one embodiment, the touch sensing element further includes a plurality of first conductive leads and a plurality of second conductive leads, each first conductive lead is connected to an end of the first conductive trace, and each second conductive lead is connected to an end of the second conductive trace.

According to one embodiment, a shape of the color traces and a pattern which is formed by the first conductive traces, the second conductive traces, the first conductive leads, and the second conductive leads are complementary, and the color traces are insulated from the first conductive traces, the second conductive traces, the first conductive leads, and the second conductive leads.

According to one embodiment, the first conductive traces, the second conductive traces, the color traces, the first conductive leads, and the second conductive leads are formed by conductive wires.

According to one embodiment, the first conductive traces, the second conductive traces, the color traces, the first conductive leads, and the second conductive leads are grid conductive wires formed by the intersection of conductive wires.

According to one embodiment, the conductive wires which form the color traces are arranged in a grid form, a sawtooth form or a polyline form, and the conductive wires which form the color traces are truncated with intervals of a predetermined length.

According to one embodiment, the conductive wires form a notch at the truncated portion, the notch is arranged in a line form in both the first and second direction of the two dimensional coordinate system.

According to one embodiment, the conductive wires are made of a material selected from metal, indium tin oxide, transparent polymer materials, grapheme, and carbon nanotubes.

According to one embodiment, each first conductive trace comprises a first main wire and a plurality of first lateral branches extended along a lateral direction of the main wire, each second conductive trace comprises a second main wire and a plurality of second lateral branches extended along a lateral direction of the second main wire, the first main wire and second main wire extend along the second dimension of the two dimensional coordinate system, ends of second main wires are spaced from each other, the first lateral branches and the second lateral branches are arranged at intervals alternately.

According to one embodiment, the first lateral branches and the second lateral branches extend along the first direction of the two dimensional coordinate system in parallel to each other.

According to one embodiment, the touch sensing element further includes a substrate layer, the substrate layer is located on one surface of the insulating substrate. A plurality of grooves are defined on the substrate layer, the first conductive traces and the second conductive traces are formed in the grooves, and the depth of the grooves is not less than the thickness of the first conductive traces and the second conductive traces.

A touch panel includes a panel and a touch sensing element located on a surface of the panel, the touch sensing element includes an insulating substrate and a conductive layer located on a surface of the insulating substrate, the conductive layer includes:

a plurality of first conductive traces, arranged at intervals along a first direction of a two dimensional coordinate system, each first conductive trace extending along a second direction of the two dimensional coordinate system; and a plurality of second conductive traces arranging to form a plurality of second conductive trace columns, each second conductive trace column comprises a plurality of second conductive traces arranged at intervals along the second direction of the two dimensional coordinate system, each second conductive trace column is located on a lateral direction of the first conductive trace; each second conductive trace of each conductive trace column is spaced from and forms a mutual inductance with a corresponding first conductive trace.

According to one embodiment, the touch sensing element further includes a plurality of color traces, the color traces are located between the first conductive traces and the second conductive traces, and insulated from the first conductive traces and the second conductive traces.

According to one embodiment, the touch sensing element further includes a plurality of first conductive leads and a plurality of second conductive leads, each first conductive lead is connected to an end of the first conductive trace, and each second conductive lead is connected to an end of the second conductive trace.

According to one embodiment, a shape of the color traces and a pattern which is formed by the first conductive traces, the second conductive traces, the first conductive leads and the second conductive leads are complementary, and the color traces are insulated from the first conductive traces, the second conductive traces, the first conductive leads, and the second conductive leads.

According to one embodiment, the first conductive traces, the second conductive traces, the color traces, the first conductive leads, and the second conductive leads are formed by conductive wires.

According to one embodiment, the first conductive traces, the second conductive traces, the color traces, the first conductive leads and the second conductive leads are grid conductive wires formed by the intersection of conductive wires.

According to one embodiment, wherein the conductive wires forming the color traces are arranged in a grid form, a sawtooth form or a polyline form, and the conductive wires which form the color traces are truncated with intervals of a predetermined length.

According to one embodiment, the conductive wires define a notch at the truncated portion, the notch is arranged in the form of a line in both the first and second direction of the two dimensional coordinate system.

DETAILED DESCRIPTION OF THE EMBODIMENTS

Illustrative embodiments of the disclosure are described below. The following explanation provides specific details for a thorough understanding of and enabling description for these embodiments. One skilled in the art will understand that the disclosure may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
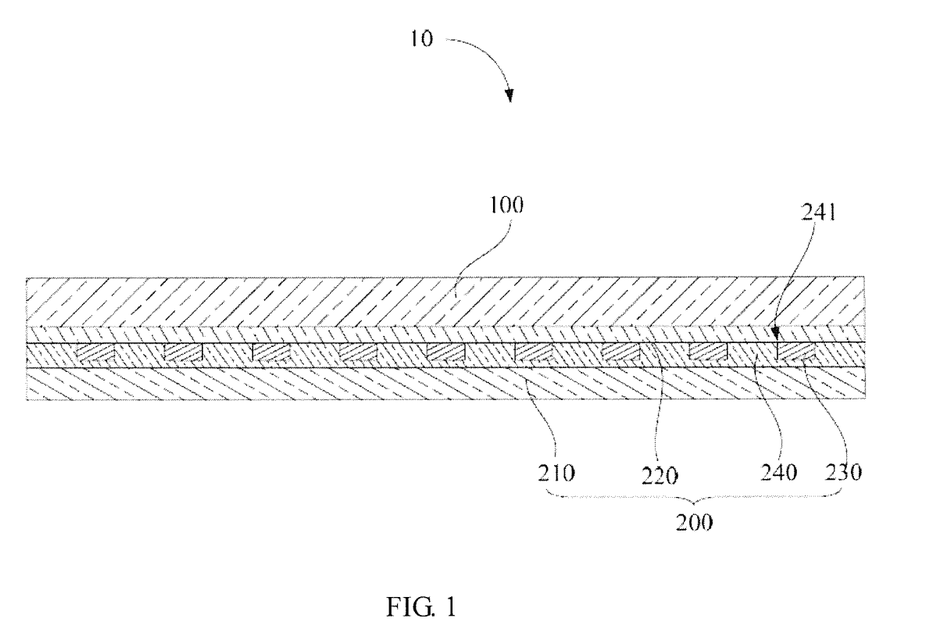
FIG. 1 is a schematic view of a touch panel in accordance with one embodiment.

Referring to FIG. 1, an embodiment of a touch panel 10 includes a panel 100 and a touch sensing element 200 located on a surface of the panel 100.

The panel 100 is a transparent panel, for example, the panel 100 can be a glass panel or a transparent plastic panel.

The touch sensing element 200 includes a transparent insulating substrate 210, a conductive layer 230 formed on a surface of the insulating substrate 210. In the illustrated embodiment, the touch sensing element 200 is bonded to the panel 100 by an optically transparent adhesive layer 220.

The insulating substrate 210 is shaped as a sheet, which is made of polyethylene terephthalate plastic (PET), polycarbonate (PC) or glass. The insulating substrate 210 has a first surface and a second surface opposite to the first surface. The conductive layer 230 is located on the first surface of the insulating substrate 210. In the illustrated embodiment, the conductive layer 230 is attached to the first surface of the insulating substrate 210 by a substrate layer 240. The substrate layer 240 is made of insulated and transparent material, such as solvent-free UV curing acrylic resin. The substrate layer 240 defines a plurality of grooves 241; the conductive layer 230 is formed in the grooves 241. The depth of the grooves 241 is not less than the thickness of the conductive layer 230. The substrate layer 240 is also used in forming the conductive layer 230 in the practical production.

Figure 2:
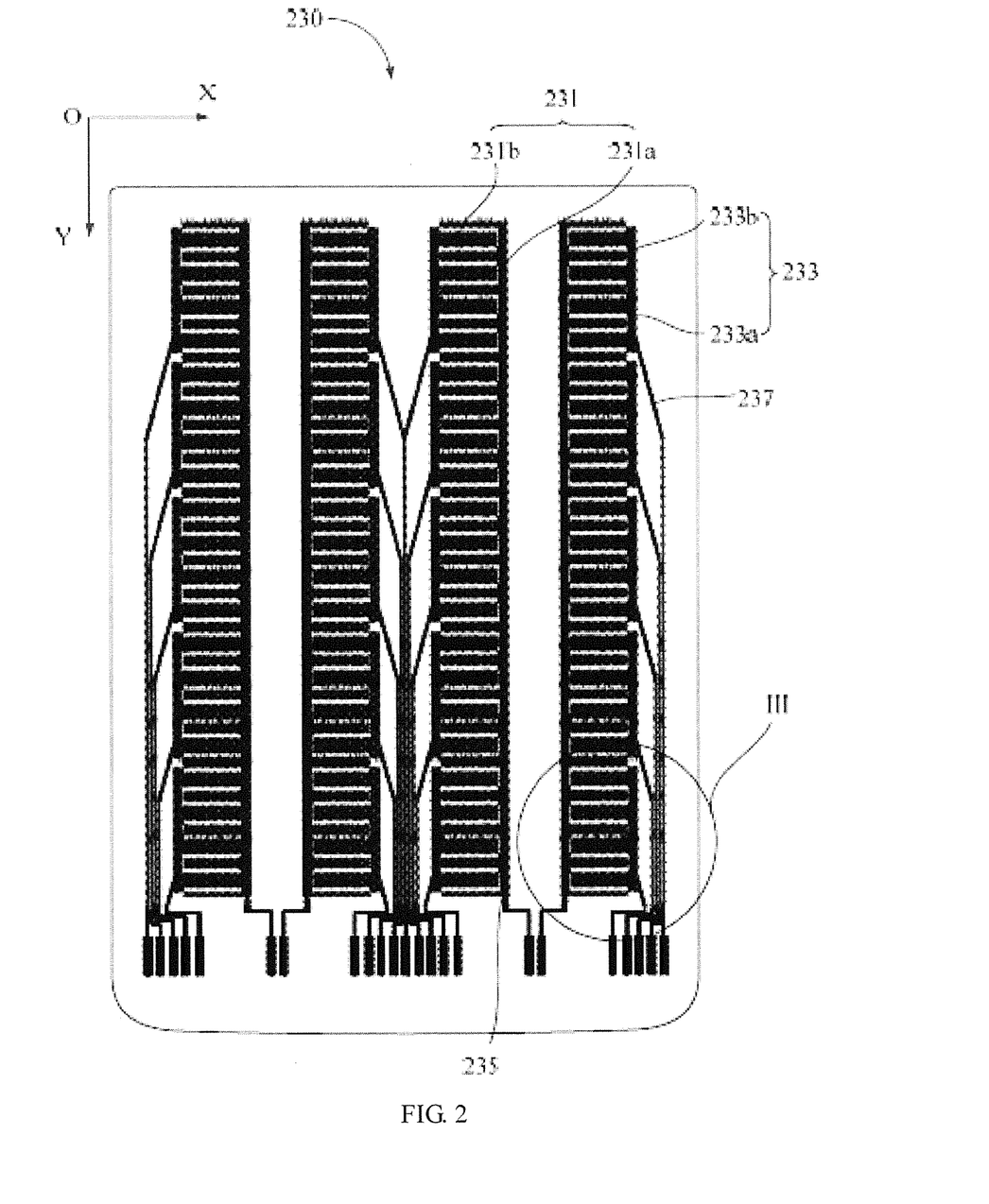
FIG. 2 is a schematic view of a touch sensing element of the touch panel in FIG. 1.

Referring to FIG. 2, the conductive layer 230 includes a plurality of spaced first conductive traces 231 and a plurality of spaced second conductive traces 233. In the illustrated embodiment, the first conductive traces 231 and the second conductive traces 233 are formed by arranging a plurality of conductive wires in a grid form. The grid is shaped as a rhombus. The conductive wires are located in the grooves 241 of the substrate layer 240. The conductive wires are made of a material selected from gold, silver, copper, aluminum, zinc, and their alloys.

A plurality of first conductive traces 231 are arranged along a first direction of a two dimensional coordinate system, each first conductive trace 231 extends along a second direction of the two dimensional coordinate system. Each first conductive trace 231 includes a first main wire 231a and a plurality of lateral branches 231b extended along a lateral direction of the first main wire 231a. The first main wire 231a extends along the second direction of the two dimensional system and parallel to the second dimension, the first lateral branches 231b extend along the first direction of the two dimensional coordinate system in parallel to the first dimension.

The second conductive traces 233 are arranged in a plurality of second conductive trace columns, each second conductive trace column comprises a plurality of second conductive traces 233 arranged at intervals along the second direction of the two dimensional coordinate system, each second conductive trace column is located on the lateral side of a corresponding first conductive trace 231, each second conductive trace 233 of each conductive trace column is spaced from each other and forms a mutual inductance with a corresponding first conductive trace 231. Each second conductive trace 233 includes a second main wire 233a and a plurality of second lateral branches 233b extended along a lateral direction of the second main wire 233a. The second main wire 233a extends along the second direction of the two dimensional coordinate system, ends of second main wires 233a are spaced.

In the illustrated embodiment, the two dimensional coordinate system is a XOY cartesian coordinate system, the first direction is the X axis, the second direction is the Y axis. It is to be understood, in alternative embodiments, the two dimensional coordinate system can be another coordinate system, such as a two dimensional oblique coordinate system.

Figure 3:
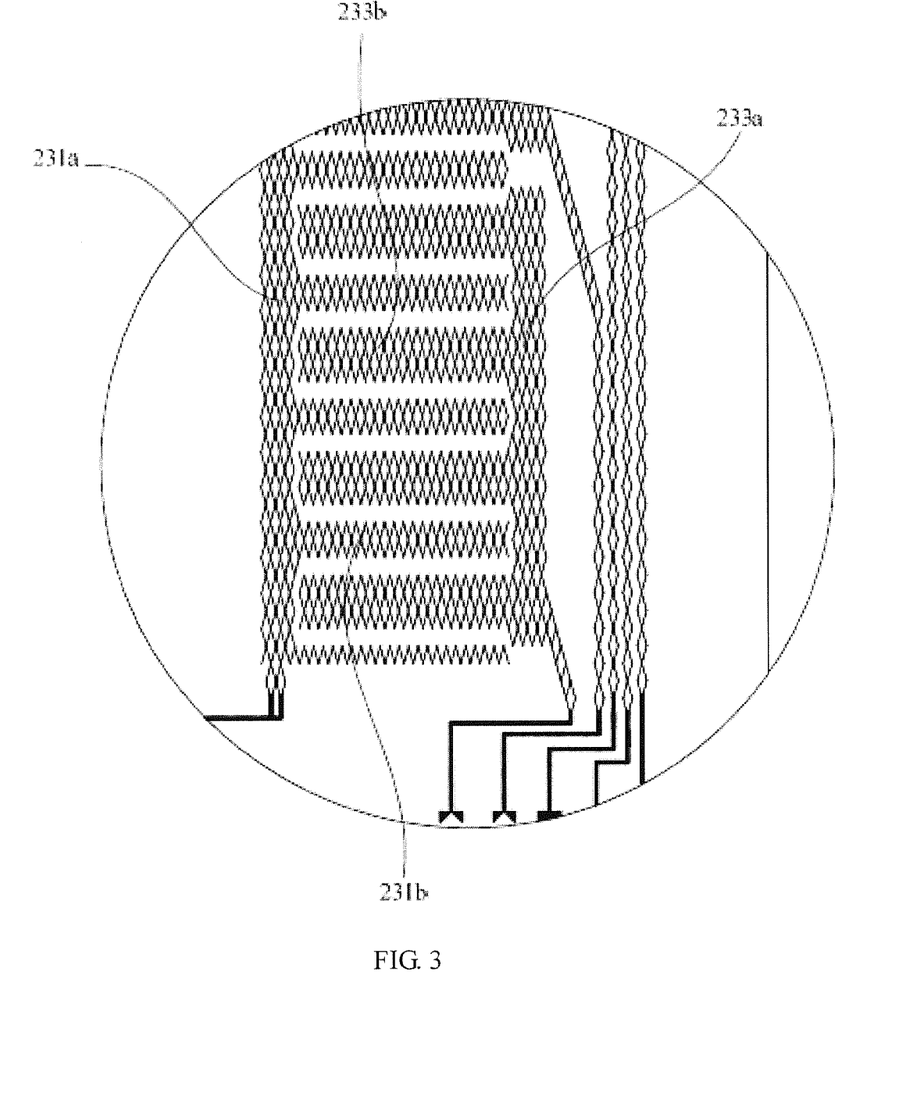
FIG. 3 is an enlarged view of the circle III in FIG. 2.

Referring to FIG. 3, the second lateral branches 233b extend along the first direction of the two dimensional coordinate system in parallel to the first direction. The first lateral branches 231b and the second lateral branches 233b are located between the first main wire 231a and the second main wire 233a, and they are cross arranged with intervals to form a mutual inductance with the first conductive trace 231.

The conductive layer 230 further includes a plurality first conductive leads 235 and a plurality of second conductive leads 237, each first conductive lead 235 is connected to an end of a first conductive trace 231, thus the first conductive trace 231 and the external processing chip or the external circuit are connected. Each second conductive trace 233 is connected to an end of a second conductive trace 233, thus the first conductive trace 231 and the external processing chip or the external circuit are connected.

The first conductive leads 235 and the second conductive leads 237 can also be formed by arranging a plurality of conductive wires in a grid form. The grid is also shaped as a rhombus. The conductive wire is made of a material selected from gold, silver, copper, aluminum, zinc, nickel and their alloys.

While the touch panel is working, the first conductive traces 231 of the conductive layer 230 can realize the positioning of the touch position on the first direction of the two dimensional coordinate system, the second conductive traces 233 of the conductive layer 230 can realize the positioning of the touch position on the second direction of the two dimensional coordinate system. The second conductive traces 233 are arranged with intervals on the first direction and second direction of the two dimensional coordinate system, thus a true multi-touch operation can be achieved, no ghost point would appear. Moreover, the conductive layer 230 of the touch panel 10 is formed on a surface of the insulating substrate 210, the structure and process of the touch sensing element 200 are much simpler compared to that of the touch panel which forms the conductive layers on two surfaces of the insulating substrate.

In the illustrated embodiment, the first conductive traces 231, the second conductive traces 233, the first conductive leads 235, the second conductive leads 237 of the conductive layer 230 are formed by arranging a plurality of conductive wires in a grid form. However, in alternative embodiments, the first conductive traces 231, the second conductive traces 233, the first conductive leads 235, and the second conductive leads 237 can be made of other materials, such as indium tin oxide (ITO), conductive polymer material, graphene and carbon nanotubes.

Figure 4:
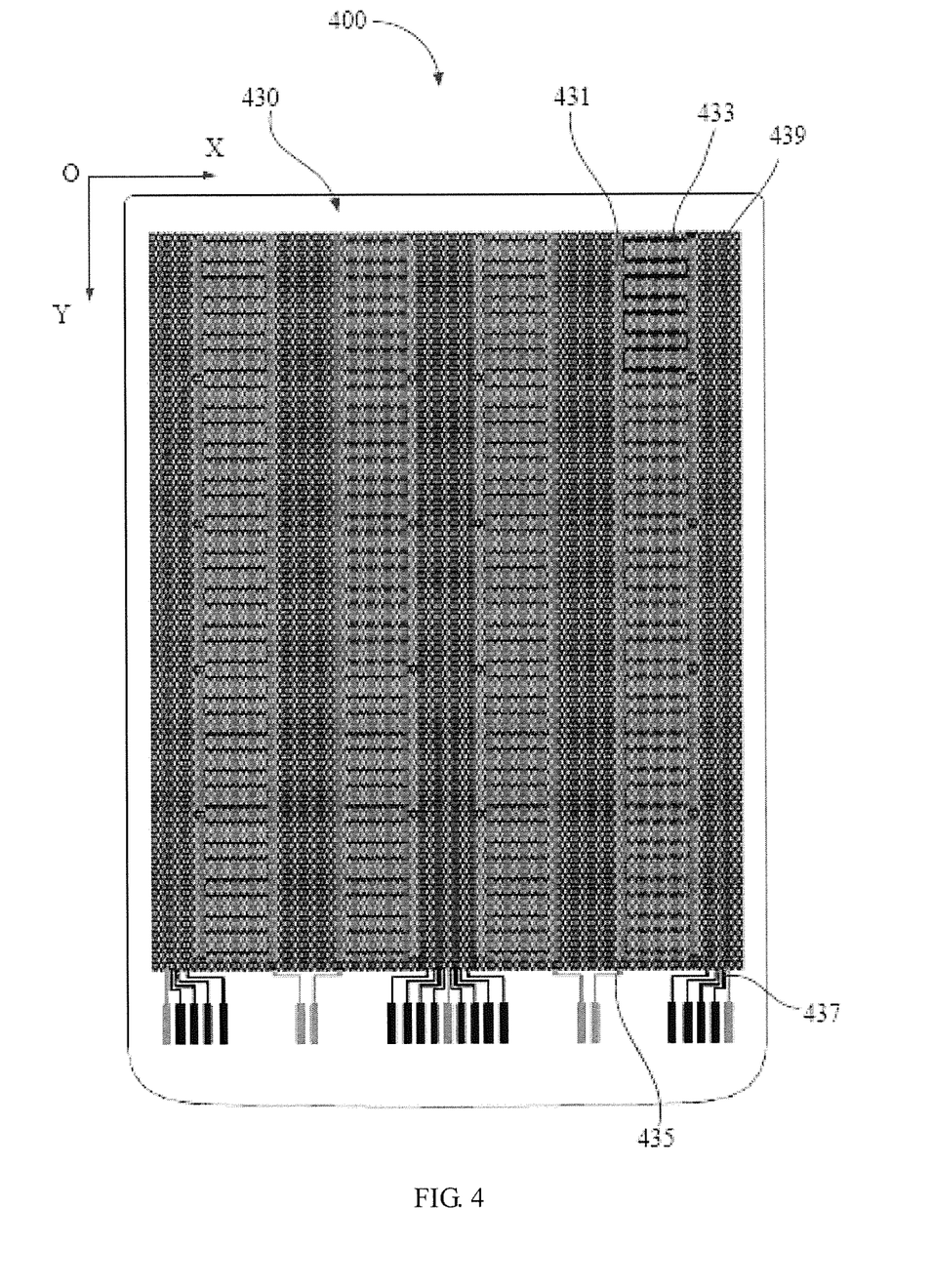
FIG. 4 is a schematic view of a touch sensing element in accordance with another embodiment.

FIG. 4 shows a touch sensing element 400 of another embodiment, which is substantially the same as the touch sensing element 200 of the previous embodiment. The differences are: the conductive layer 430 of the touch sensing element 400 of the embodiment shown in FIG. 4 further includes a plurality of color traces 439.

Figure 5:
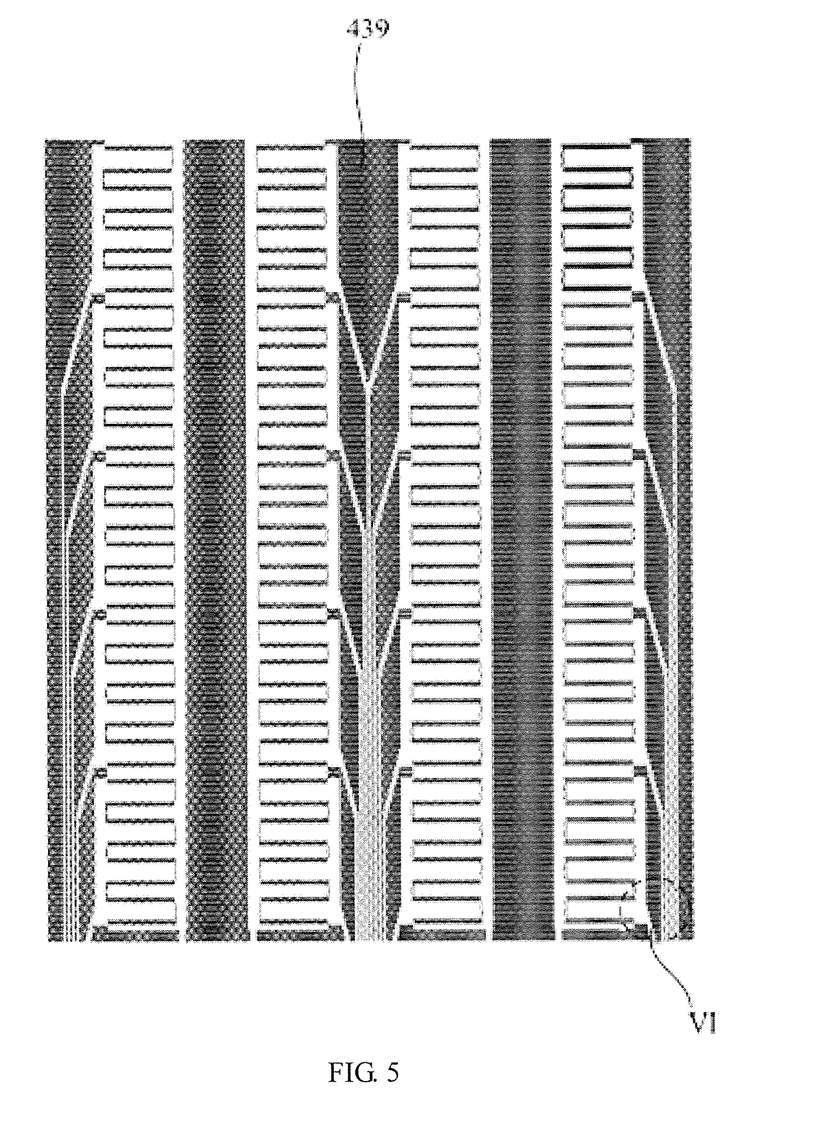
FIG. 5 is a schematic view of a color trace of the touch sensing element in FIG. 4.

Referring to FIG. 5, the color traces 439 are located between the first conductive traces 431 and the second conductive traces 433 and insulated from the first conductive traces 431, the second conductive traces 433, the first conductive leads 435, and the second conductive leads 437. A shape of the color trace 439 and a pattern which is formed by the first conductive traces 431, the second conductive traces 433, the first conductive leads 435, and the second conductive leads 437 are complementary.

Figure 6:
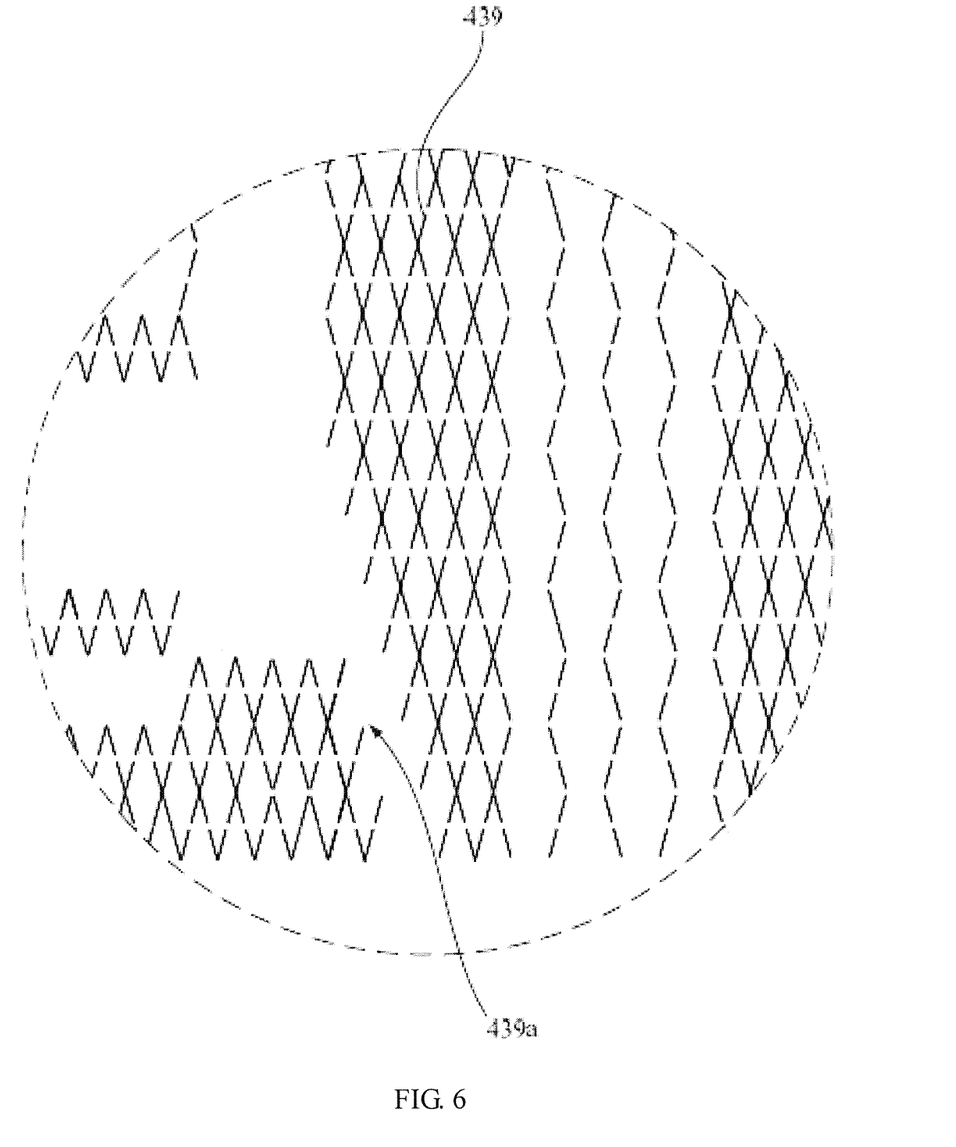
FIG. 6 is a partial enlarged view of part VI in FIG. 5.

Referring to FIG. 6, the color traces 439 are located among the first conductive traces 431, the second conductive traces 433, the first conductive leads 435, and the second conductive leads 437. The color traces 439 are formed by the conductive wires arranged in a grid form, a sawtooth form or a polyline form. The conductive wires which form the color traces 439 and the conductive wires which form the first conductive traces 431, the second conductive traces 433, the first conductive leads 435, and the second conductive leads 437 are disconnected. Each grid cell is disconnected in the middle part. The conductive wires form a notch 439a at the truncated portion, the notch 439a is arranged in the form of a line in both the first and second directions. The diameter of the conductive wires of the color traces 439 and the diameter of the conductive wires which form the first conductive traces 431, the second conductive traces 433, the first conductive leads 435 and the second conductive leads 437 are the same.

The color traces 439 make the light of the touch sensing element 400 appear more uniform, the user comfort thus can be enhanced.

Although the present disclosure has been described with reference to the embodiments thereof and the best modes for carrying out the present disclosure, it is apparent to those skilled in the art that a variety of modifications and changes may be made without departing from the scope of the present disclosure, which is intended to be defined by the appended claims.

What is claimed is:

1. A touch sensing element, comprising an insulating substrate and a conductive layer located on a surface of the insulating substrate, wherein the conductive layer comprises:
   a plurality of first conductive traces arranged at intervals along a first direction of a two dimensional coordinate system, each of the first conductive traces extending along a second direction of the two dimensional coordinate system;
   a plurality of second conductive traces arranged to form a plurality of second conductive trace columns, wherein each second conductive trace column comprises a plurality of second conductive traces arranged at intervals along the second direction of the two dimensional coordinate system, each second conductive trace column is located corresponding to a lateral direction of a corresponding first conductive trace of the plurality of first conductive traces; each second conductive trace of each conductive trace column is spaced from and forms a mutual inductance with a corresponding first conductive trace;

a plurality of color traces, the color traces are located between the first conductive traces and the second conductive traces and insulated from the first conductive traces and the second conductive traces; and a plurality of first conductive leads and a plurality of second conductive leads, each first conductive lead is connected to an end of a respective first conductive trace of the plurality of first conductive traces, and each second conductive lead is connected to an end of a respective second conductive trace of the plurality of second conductive traces; wherein the first conductive traces, the second conductive traces, the color traces, the first conductive leads and the second conductive leads are formed by conductive wires;

wherein the first conductive traces, the second conductive traces, the color traces, the first conductive leads and the second conductive leads are grid conductive wires formed by the intersection of conductive wires;

wherein the conductive wires forming the color traces are arranged in a grid form, a sawtooth form or a polyline form, and the conductive wires which form the color traces are truncated with intervals of a predetermined length; and wherein the conductive wires forming the color traces define a notch at the truncated portion, the notch is arranged in the form of a line in both the first and second directions of the two dimensional coordinate system.

2. The touch sensing element according to claim 1, wherein a shape of the color traces and a pattern which formed by the first conductive traces, the second conductive traces, the first conductive leads, and the second conductive leads are complementary; and the color traces are insulated from the first conductive traces, the second conductive traces, the first conductive leads and the second conductive leads.

3. The touch sensing element according to claim 1, wherein the conductive wires are made of a material selected from metal, indium tin oxide, transparent polymer materials, grapheme, and carbon nanotubes.

4. The touch sensing element according to claim 1, wherein each first conductive trace comprises a first main wire and a plurality of first lateral branches extended along a lateral direction of the main wire, each second conductive trace comprises a second main wire and a plurality of second lateral branches extended along a lateral direction of the second main wire, the first main wire and second main wire extend along the second dimension of the two dimensional coordinate system, ends of second main wires are spaced from each other, the first lateral branches and the second lateral branches are arranged at intervals alternately.

5. The touch sensing element according to claim 4, wherein the first lateral branches and the second lateral branches extend along the first direction of the two dimensional coordinate system in parallel to each other.

6. The touch sensing element according to claim 1, further comprising a substrate layer, the substrate layer is located on one surface of the insulating substrate, a plurality of grooves are defined on the substrate layer, the first conductive traces and the second conductive traces are formed in the grooves, the depth of the grooves is not less than the thickness of the first conductive traces and the second conductive traces.

7. A touch panel, comprising a panel and a touch sensing element located on a surface of the panel, wherein the touch sensing element comprises an insulating substrate and a conductive layer located on a surface of the insulating substrate, the conductive layer comprises:

a plurality of first conductive traces arranged at intervals along a first direction of a two dimensional coordinate system, each first conductive trace extending along a second direction of the two dimensional coordinate system;

a plurality of second conductive traces arranged to form a plurality of second conductive trace columns, each second conductive trace column comprises a plurality of second conductive traces arranged at intervals along the second direction of the two dimensional coordinate system, each second conductive trace column is located corresponding to a lateral direction of a corresponding first conductive trace of the plurality of first conductive traces;

each second conductive trace of each conductive trace column is spaced from each other and forms a mutual inductance with a corresponding first conductive trace;

a plurality of color traces, the color traces are located between the first conductive traces and the second conductive traces, and insulated from the first conductive traces and the second conductive traces; and a plurality of first conductive leads and a plurality of second conductive leads, each first conductive lead is connected to an end of a respective first conductive trace of the plurality of first conductive traces, and each second conductive lead is connected to an end of a respective second conductive trace of the plurality of second conductive traces;

wherein a shape of the color traces and a pattern formed by the first conductive traces, the second conductive traces, the first conductive leads and the second conductive leads are complementary, and the color traces are insulated from the first conductive traces, the second conductive traces, the first conductive leads and the second conductive leads;

wherein the first conductive traces, the second conductive traces, the color traces, the first conductive leads and the second conductive leads are formed by conductive wires;

wherein the first conductive traces, the second conductive traces, the color traces, the first conductive leads and the second conductive leads are grid conductive wires formed by the intersection of conductive wires;

wherein the conductive wires forming the color traces are arranged in a grid form, a sawtooth form or a polyline form, and the conductive wires which form the color traces are truncated with intervals of a predetermined length; and wherein the conductive wires forming the color traces defines a notch at the truncated portion, the notch is arranged in a line form in both the first and second direction of the two dimensional coordinate system.

* * * * *